(12) United States Patent
Grantham et al.

(10) Patent No.: US 6,235,349 B1
(45) Date of Patent: May 22, 2001

(54) METHOD OF PRESSURE TREATING BOARDS

(75) Inventors: Robert Grantham, Fort Meyers, FL (US); John S. Warren, Jr., Mobile, AL (US)

(73) Assignee: Tarren Wood Products, Inc., Fort Myers, FL (US)

( * ) Notice: Subject to any disclaimer, the term of this patent is extended or adjusted under 35 U.S.C. 154(b) by 0 days.

(21) Appl. No.: 09/303,722

(22) Filed: Apr. 30, 1999

Related U.S. Application Data

(63) Continuation-in-part of application No. PCT/US97/19812, filed on Oct. 30, 1997.
(60) Provisional application No. 60/029,460, filed on Oct. 30, 1996.

(51) Int. Cl.[7] .................................. B05D 3/00; B05D 1/18
(52) U.S. Cl. ...................... 427/397.8; 427/297; 427/325; 427/351; 427/440
(58) Field of Search ..................................... 427/297, 325, 427/351, 440, 393, 393.3, 397, 397.8

(56) References Cited

U.S. PATENT DOCUMENTS

| | | |
|---|---|---|
| 3,306,765 | 2/1967 | Du Fresne et al. ................... 117/62 |
| 3,968,276 * | 7/1976 | Allen ................................... 427/297 |
| 3,974,318 | 8/1976 | Lilla . |
| 4,542,146 * | 9/1985 | Van Gestel et al. ................. 514/383 |
| 4,992,307 | 2/1991 | Ikeda . |
| 5,035,951 | 7/1991 | Dimanshteyn . |
| 5,389,309 | 2/1995 | Lopez . |
| 5,478,598 * | 12/1995 | Shiozawa ............................. 427/297 |
| 6,040,057 * | 3/2000 | Slimak et al. ....................... 428/453 |

* cited by examiner

Primary Examiner—Timothy Meeks
Assistant Examiner—Michael Barr
(74) Attorney, Agent, or Firm—Webb Ziesenheim Logsdon Orkin & Hanson, P.C.

(57) ABSTRACT

A method for treating wood products is provided wherein wood products are treated in an aqueous solution of a silicate, a rheology modifier, a wetting agent and, optionally, borax and/or a bacteriocide or fungicide; the aqueous solution having a pH of at least 9.0, preferably, a pH of 10–14, and most preferably, 13.0. A suitable dye can be added to the aqueous solution to color the wood product. The present invention is also directed to an aqueous solution for pressure treating wood and a wood product prepared according to the method of the present invention.

13 Claims, 3 Drawing Sheets

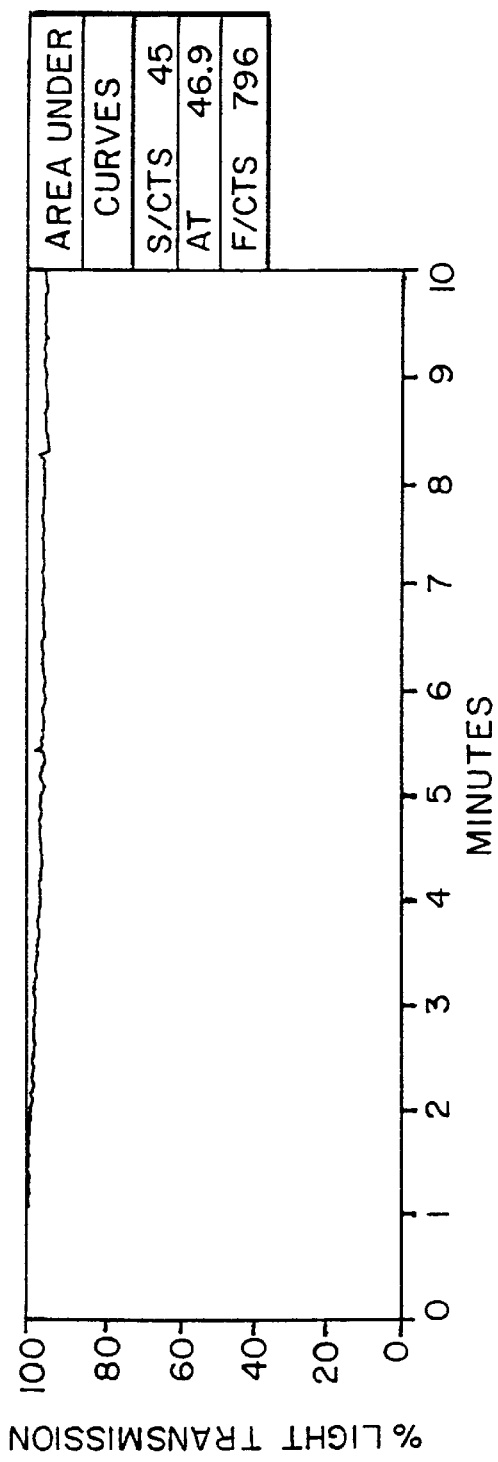
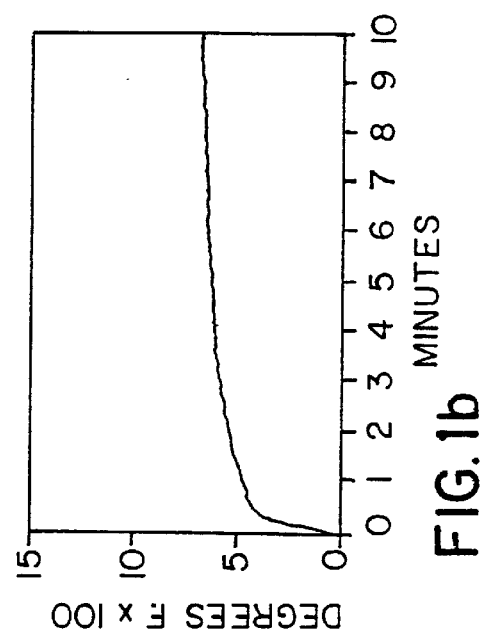
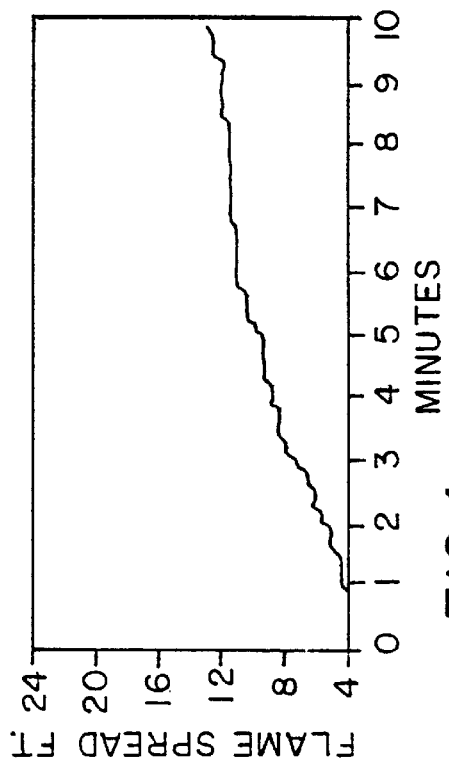

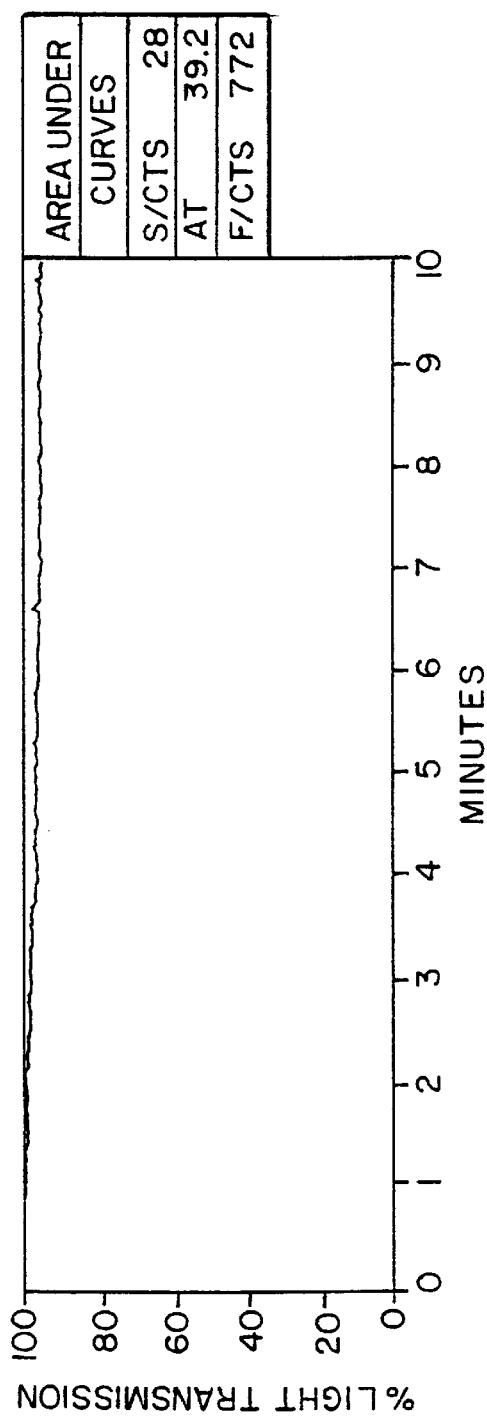
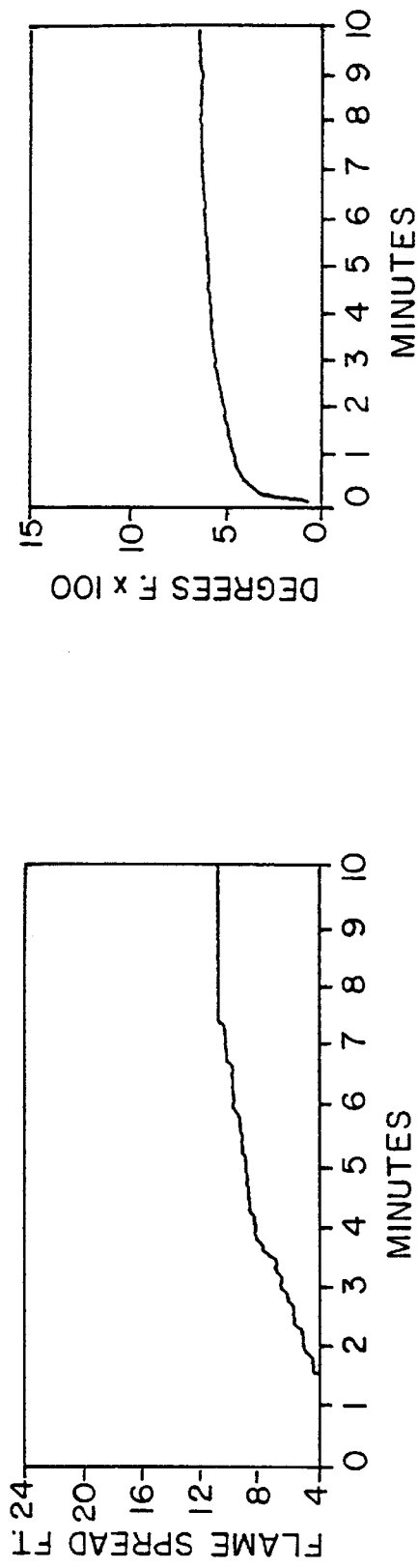
FIG. 2c
FIG. 2b
FIG. 2a

METHOD OF PRESSURE TREATING BOARDS

This is a Continuation-in-Part of PCT Patent Application No. PCT/US97/19812 filed Oct. 30, 1997, designating the United States, which claims the benefit of earlier filed United States Provisional Application Ser. No. 60/029,460 filed Oct. 30, 1996 entitled "Method of Pressure Treating Boards".

BACKGROUND OF THE INVENTION

1. Field of the Invention

The present invention is directed to a formaldehyde-free method for treating wood products, especially green lumber, to strengthen the wood products and to render the wood products flame retardant and resistant to moisture and insects.

2. Description of the Related Art

Prior art publications disclose treatment of wood products with chemicals such as silicates, creosote, copper naphthenate, pentachlorophenol and chromated copper arsenate to preserve the wood products and to render them fire-retardant and insect repellant. After treatment, the wood products can be painted, soaked or pressure treated to coat and/or impregnate the wood products.

U.S. Pat. No. 3,974,318 to Lilla, discloses such a process. In the Lilla patent, a water soluble silicate composition is applied to a wood product and the product is subsequently treated with a water soluble metallic salt compound to form a water insoluble metallic silicate in the wood product.

Although the prior art methods and compositions are suitable for treating dried lumber and manufactured (engineered) wood products, no products or methods have been found suitable for treating green lumber or other wood products having a high water content.

It is, therefore, an object of the present invention to provide a wood product treatment method and a compound suitable for treatment of wood products, and for treating green lumber as well as to provide a superior method and composition for completely treating dried lumber and manufactured wood products.

SUMMARY OF THE INVENTION

The present invention is directed to a method and a composition for treating wood products and a treated wood product prepared according to the methods of the present invention. The method provides for treating the wood products with a silicate based solution that will fully penetrate and preserve wood products, including green lumber. The method includes pressure treating the wood products in an aqueous solution of sodium silicate which further includes a wetting agent and a rheology modifier at a pH of at least 9.0 and, preferably, at a pH of at least 13.0. Most preferably, the aqueous solution includes a borax and/or a bacteriocide or fungicide. Addition of the rheology modifier and the wetting agent to the solution allows the chemicals to fully penetrate the wood product irrespective of whether the wood product is green lumber or a dried and/or engineered wood product.

The pressure treating method of the present invention includes the following steps: placing the material in a pressure vessel and applying a vacuum; contacting the material with an aqueous solution and increasing the pressure in the pressure vessel; draining the aqueous solution and reducing the pressure, preferably, applying a vacuum; and drying the treated wood product.

In an alternative method, wood particles are mixed in a slurry of the aqueous solution and a glue; the slurry is injected into a press, for instance a steam press, and the slurry is pressed to form a board or other engineered wood product. The engineered wood product can be fiberboard, particle board or oriented strand board.

The wood product is then cured. As a further alternative, the aqueous solution and/or other additives can be injected directly into the press prior to pressing and curing.

The composition of the present invention is an aqueous solution having a pH of at least 9.0, preferably of 10–14 and, most preferably, 13.0 and includes silicate, a wetting agent and a rheology modifier, the solution preferably includes borax and/or a bacteriocide or fungicide.

Lastly, the present invention is also directed to pressure treated wood product prepared by one of the above-described methods.

BRIEF DESCRIPTION OF THE DRAWINGS

FIGS. 1a–c are graphic representations of flame spread distance, temperature and smoke developed versus time in testing of ⅝" oriented strand board (OSB) prepared according to the method of the present invention.

FIGS. 2a–c are graphic representations of flame spread distance, temperature and smoke developed versus time in testing of ¾" particle board prepared according to the method of the present invention.

DESCRIPTION OF THE PREFERRED EMBODIMENTS

Figure 3C:
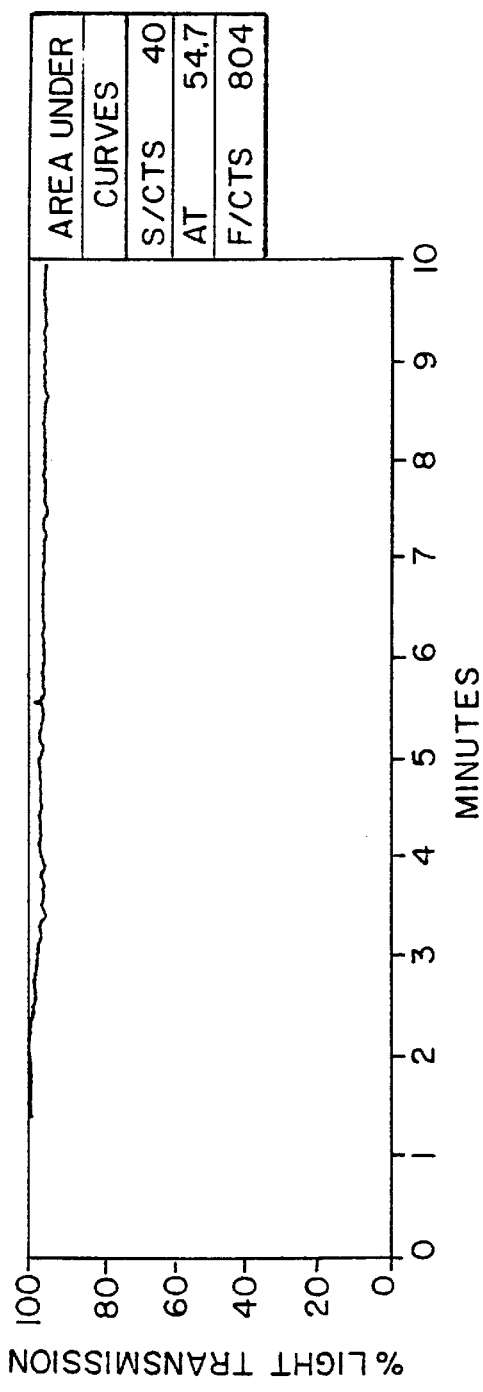
FIGS. 3a–c are graphic representations of flame spread distance, temperature and smoke developed versus time in testing of ⅝" Douglas fir plywood prepared according to the method of the present invention.

The present invention is directed to a method and composition for treatment of wood products which preserves the wood products and renders the wood products fire, moisture, fungus and insect resistant. The term "wood products" refers generally to products derived from wood, but is not exclusively limited to oriented strand board (OSB), medium-density fiberboard (MDF), plywood, particle board, paper products and natural wood products, including both green and dried lumber. The treated wood products are generically useful for construction purposes. More specifically, for purpose of example only, the treated products may be used in flooring, fire doors, exterior beams and columns, fire panel materials and sheeting, exterior sheeting including siding, cabinet manufacturing, furniture manufacturing, railroad cross ties, landscape timbers, floor plating, fire-retardant lumber, door jambs, sea walls, countertops, exterior fascia material and in window manufacturing.

The method of the present invention utilizes an aqueous solution for treating the wood products which includes a silicate, a wetting agent and a rheology modifier. The pH of the solution is greater than 9.0, preferably 10–14 and, most preferably, 13.0. In use, for instance, when the aqueous solution is used in diluted form, it is desirable to maintain the pH of the solution at 11.2 to 11.4. The solution may include borax as an insecticidal agent and/or a bacteriocide or fungicide. The relative quantities of components of the aqueous solution may be varied, the ranges of the components of the solution are preferably between 18% and 60% sodium silicate, 0.01% and 2% wetting agent and 0.01% to 2% rheology modifier. Optionally, between 1% and 10% borax and/or 0.1% and 1% bacteriocide or fungicide can be included in the solution. All percentages relating to the composition of the aqueous solution are % wt. The remainder of the solution includes water and any other desirable additive such as a suitable dye or staining agent. The aqueous solution is most preferably 61.8% water, 38% sodium silicate, 0.1% wetting agent and 0.1% rheology modifier. The solution optionally includes 5% borax, with appropriate adjustments in the water content. A further optional ingredient is 0.2% bacteriocide or fungicide with appropriate adjustments in the water content.

Examples of rheology modifiers include, but are not limited to, thickening agents including cellulosic agents, such as hydroxymethyl cellulose, lignum and carboxymethyl cellulose, and acrylic thickeners. Examples of suitable wetting agent include, but are not limited to, metasodium silicate, sodium dodecyl sulfate, sodium lauryl sulfate and trisodium phosphate. The aqueous solution is preferably prepared having 21% solids, or active ingredients, as measured by refractive index. In use, the aqueous solution may be diluted to a range between 0 and 21% solids or active ingredients. The suitable dilution for a given wood product is determined empirically. For instance, it was empirically determined that MDF and particle board are best treated with a solution of 8% solids while railroad ties (red and white oak) are best treated with a solution of 12% solids.

The bacteriocide or fungicide can be any suitable agent which does not substantially affect the ability of the aqueous solution to preserve the treated wood products. However, it was found that 0.2% CIL-75 (Dow) or methyl paraben are particularly suitable for this purpose. These agents have not been previously recognized as useful in wood processing. In addition, these agents have the added benefit in that they are environmentally safe and are approved for use in food and in food service areas.

To treat the wood products according to the present invention, the wood product is placed in a pressure vessel. The door of the pressure vessel is closed, and a vacuum of approximately 35 pounds, per square inch is applied. The chamber is flooded with the aqueous solution described above.

A pressure of 40 to 160 pounds per square inch is applied to the wood products in the aqueous solution. Most preferably, pressure of 40 pounds per square inch is applied for particle board, MDF and OSB and a pressure of 140 pounds per square inch is applied for natural wood products. During pressure treatment, the aqueous solution is circulated under pressure for between 20 and 90 minutes. The wood products are preferably treated for 30 minutes in the case of particle board, MDF and OSB and 90 minutes in the case of natural wood products. The chamber is drained and a vacuum of about 30 pounds per square inch is held for 10 minutes. The chamber is opened and the treated wood product is removed. The treated wood product is then either placed in a drying kiln and slow-dried for 24 hours with hot air and steam, air dried for 10 days or microwave dried for up to 8 hours.

The aqueous solution of the present invention also can be used in a variety of methods commonly used for preparation of "engineered" wood products such as, without limitation, particle board, fiberboard and oriented strand board. These wood products are generally prepared by forming a slurry of wood fibers or particles and an appropriate glue. The slurry is placed in a steam press, forming the wood product. The wood product is subsequently cured. According to one embodiment of the present invention, the cured wood product is pressure treated in the presence of the aqueous solution, as described above.

The wood product can also be treated with the aqueous solution at an earlier stage. In one version of the method of the present invention, the aqueous solution and any additional additives are mixed into the slurry of wood fibers or particles and glue, prior to placing the slurry into the steam press. Alternatively, the aqueous solution and additives are added to the press after the slurry is placed into the press. Importantly, the superior penetrating and preservation activity of the aqueous solution according to the present invention allows addition of the aqueous solution and/or any further additives at any time during the preparation of the engineered wood product, or afterward, so long as the addition of the aqueous solution is physically possible.

EXAMPLES

The fire-retardant ability of this process was evaluated according to the following procedure by the Hardwood Plywood and Veneer Association Laboratory and Testing Service, a commercial testing service, in accordance with ASTM designation E 84, "Standard Test Method for Surface Burning Characteristics of Building Materials." This 25-foot tunnel method is also described by NFPA No. 255 and UL No. 723.

The purpose of the test is to determine the relative performance of the test material under standardized fire exposure. Results are given for flame spread and smoke developed. The values obtained from burning the test material represent a comparison with that of ¼" inorganic reinforced cement board expressed as zero and red oak flooring expressed as 100. The furnace was preheated to a minimum of 150° F. as measured by an 18 AWG thermocouple embedded in cement ⅛" below the floor surface of the chamber, 23-¼ feet from the center line of the ignition burners. The furnace is then cooled to 105° F. (±5° F.) as measured by a thermocouple embedded ⅛" below the floor surface of the test chamber 13 feet from the fire end.

Prior 10-minute tests with ¼" inorganic reinforced cement board provided the zero reference for flame spread. Periodic 10-minute tests with unfinished select grade red oak flooring provided for the 100 reference for flame spread and smoke development.

The wood products tested in the following examples were treated in the following manner. The material was placed in a pressure vessel. The door was then closed, and a vacuum of 35 pounds, per square inch was achieved. The chamber was flooded with a 32% volume solution of WOF-24, TWF-27 or TWF-27B to a pressure of 110 pounds. The solution was circulated for 30 minutes. The chamber was drained, and vacuum of 30 pounds per square inch was pulled and held for 10 minutes. The chamber was then returned to ambient atmospheric pressure. The chamber was opened and the treated wood product was removed and placed in a drying kiln where it was slow-dried for 24 hours with hot air and steam.

Example 1
WOF-24 Pressure-Treated ⅝" OSB

A ⅝" OSB test sample was prepared and tested according to the procedures described above. The test results are as follows:

Material Tested

| | | |
|---|---|---|
| 1) | Manufacturer: World Environmental Irvington, Alabama | |
| 2) | Burn Number | 1 |
| 3) | Average Thickness (in.) | .547 |
| 4) | Average Weight (lbs./sq.ft.) | 2.38 |
| 5) | Average Groove Depth (in.) | N/A |
| 6) | Product Description: WOF-pressure-treated ⅝" oriented strand board Treatment concentration: 33% WOF-24 | |
| 7) | Color | Brown |
| 8) | Surface | Both sides treated |
| 9) | Sample Selection | Manufacturer |
| 10) | Date of Selection | 4/1996 |
| 11) | Material Description By | Manufacturer |
| 12) | Method of Mounting | Self-supporting on ledges |
| 13) | Sample Conditioning (days) | 22 |

Test Conditions and Data

| | | |
|---|---|---|
| 1) | Specimen Preheat Time (min.) | 2:00 |
| 2) | Tunnel Brick Temp. (deg. F.) | 105 |
| 3) | Ignition Time (seconds) | 55 |
| 4) | Time to End of Tunnel or Flamefront Distance | 13' @ 10:00 |
| 5) | Time-Distance Curve Area (min. /ft.) | 46.9 |
| 6) | Fuel and Temperature | |
| | a) Fuel (cu.ft./min.) | 4.946 |
| | b) Max. Vent End Temp. (deg. F.) | 680 |
| | c) Time to Max. Temp. (min.) | 9:55 |
| 7) | After Flaming | No |

Test Results

Test results calculated on the basis of the areas under the curves of flame spread distance, temperature and smoke developed versus time, as shown in FIGS. 1a–c, are provided in the table below for calibration materials and for:

| | WOF-24 Pressure-Treated ⅝" Douglas Fir Board | | |
|---|---|---|---|
| Material Description | Flame Spread | Fuel Contributed | Smoke Developed Index |
| High-density inorganic reinforced cement board | 0 | 0 | 0 |
| Red oak flooring | 100 | 100 | 100 |
| Test Sample | 30 | 20 | 15 |

OBSERVATIONS: No burnthrough. Surface charred and flaky to 11-½ feet.

REMARKS: The average moisture content of the first panel was 15.2%.

CONCLUSIONS: Based on one test, the flame spread, calculated according to ASTM E-84-94, meets Class A (Class I)—25 or under flame spread.

Example 2
WOF-24 Pressure-Treated ¾" Particle Board

A ¾" particle board test sample was prepared and tested according to the procedures described above. The test results are as follows:

Material Tested

| | | |
|---|---|---|
| 1) | Manufacturer: World Environmental Irvington, Alabama | |
| 2) | Burn Number | 1 |
| 3) | Average Thickness (in.) | .824 |
| 4) | Average Weight (lbs./sq.ft.) | 3.76 |
| 5) | Average Groove Depth (in.) | N/A |
| 6) | Product Description: WOF-24, TWP-27 and TWP-27B pressure-treated ¾" particle board Treatment concentration: 12% WOF-24, TWP-27 and TWP-27B | |
| 7) | Color | Brown |
| 8) | Surface | Both sides treated |
| 9) | Sample Selection | Manufacturer |
| 10) | Date of Selection | 4/1996 |
| 11) | Material Description By | Manufacturer |
| 12) | Method of Mounting | Self-supporting on ledges |
| 13) | Sample Conditioning (days) | 22 |

Test Conditions and Data

| | | |
|---|---|---|
| 1) | Specimen Preheat Time (min.) | 2:00 |
| 2) | Tunnel Brick Temp. (deg. F.) | 105 |
| 3) | Ignition Time (seconds) | 90 |
| 4) | Time to End of Tunnel or Flamefront Distance | 11' @ 7:30 |
| 5) | Time-Distance Curve Area (min./ft.) | 39.2 |
| 6) | Fuel and Temperature | 4.927 |
| | a) Fuel (cu.ft./min.) | |
| | b) Max. Vent End Temp. (deg. F.) | 655 |
| | c) Time to Max. Temp. (min.) | 9:50 |
| 7) | After Flaming | No |

Test Results

Test results calculated on the basis of the areas under the curves of flame spread distance, temperature and smoke developed versus time, as shown in FIGS. 2a–c, are provided in the table below for calibration materials and for:

| | WOF-24 Pressure-Treated ¾" Particle Board | | |
|---|---|---|---|
| Material Description | Flame Spread | Fuel Contributed | Smoke Developed Index |
| High-density inorganic reinforced cement board | 0 | 0 | 0 |
| Red oak flooring | 100 | 100 | 100 |
| Test Sample | 20 | 15 | 0 |

OBSERVATIONS: No burnthrough. Surface charred and flaky to 9-½ feet.

REMARKS: The average moisture content of the first panel was 16.7%.

CONCLUSIONS: Based on one test, the flame spread, calculated according to ASTM E-84-94, meets Class A (Class I)—25 or under flame spread.

Example 3
WOF-24 Pressure-Treated ⅝" Douglas Fir Plywood

The Douglas fir plywood test sample was prepared and tested according to the procedures described above. The test results are as follows:

| Material Tested | |
|---|---|
| 1) Manufacturer: World Environmental Irvington, Alabama | |
| 2) Burn Number | 1 |
| 3) Average Thickness (in.) | .616 |
| 4) Average Weight (lbs./sq.ft.) | 2.37 |
| 5) Average Groove Depth (in.) | N/A |
| 6) Product Description: WOF-24 pressure-treated ⅝" Douglas fir plywood Treatment concentration: 33% WOF-24 | |
| 7) Color | Brown |
| 8) Surface | Both sides treated |
| 9) Sample Selection | Manufacturer |
| 10) Date of Selection | 4/1996 |
| 11) Material Description By | Manufacturer |
| 12) Method of Mounting | Self-supporting on ledges |
| 13) Sample Conditioning (days) | 22 |
| Test Conditions and Data | |
| 1) Specimen Preheat Time (min.) | 2:00 |
| 2) Tunnel Brick Temp. (deg. F.) | 103 |
| 3) Ignition Time (seconds) | 65 |
| 4) Time to End of Tunnel or Flamefront Distance | 13 1/2' @ 9:30 |
| 5) Time-Distance Curve Area (min./ft.) | 54.7 |
| 6) Fuel and Temperature | |
| a) Fuel (cu. ft./min.) | 4.933 |
| b) Max. Vent End Temp. (deg. F.) | 670 |
| c) Time to Max. Temp. (min.) | 8:05 |
| 7) After Flaming | No |

Test Results

Figure 3B:
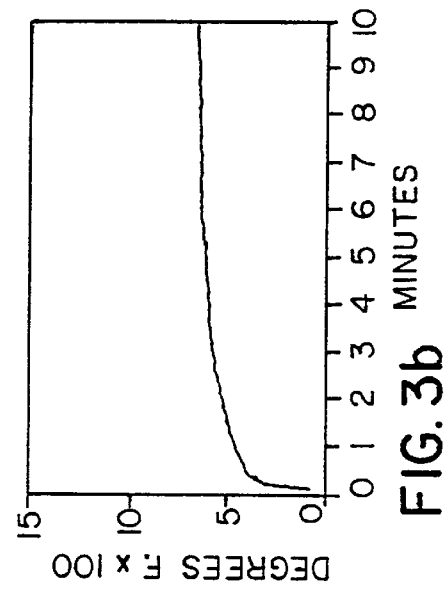
Figure 3A:
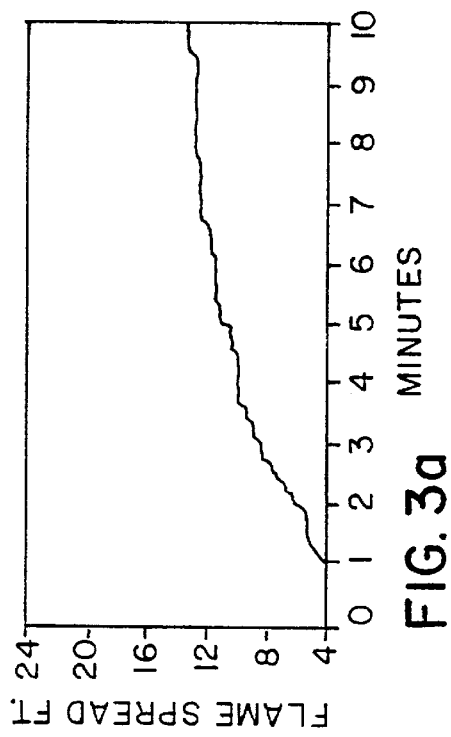

Test results calculated on the basis of the areas under the curves of flame spread distance, temperature and smoke developed versus time, as shown in FIGS. 3a–c, are provided in the table below for calibration materials and for:

| | WOF-24 Pressure-Treated ⅝" Douglas Fir Plywood | | |
|---|---|---|---|
| Material Description | Flame Spread | Fuel Contributed | Smoke Developed Index |
| High-density inorganic reinforced cement board | 0 | 0 | 0 |
| Red oak flooring | 100 | 100 | 100 |
| Test Sample | 30 | 20 | 15 |

OBSERVATIONS: No burnthrough. Surface charred and flaky to 12 feet.

REMARKS: The average moisture content of the first panel was 14.1%.

CONCLUSIONS: Based on one test, the flame spread, calculated according to ASTM E-84-94, meets Class B (Class II)—75 or under flame spread.

The primary object of the present invention is satisfied by the present invention. Prior to the present inventive method, there were no commercially suitable methods for adequately treating green lumber which preserves the lumber and renders the lumber fire, moisture and insect resistant. The present invention is therefore superior for two reasons. First, it provides a method and composition for full penetration of green lumber or other wood products having a high water content as well as providing a superior method and composition for treating dried or manufactured wood products. Second, use of a preservative that penetrates green lumber is commercially advantageous. Prior art pressure treatment methods require that the wood products to be dry before treatment. Therefore, to adequately pressure treat a wood product, the product has to be dried, treated with a preservative and re-dried. In contrast, wood products prepared according to the present invention need not be dried prior to treatment, eliminating the drying step and thereby reducing processing costs, labor costs and energy usage.

The above invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for rendering wood products fire, rot and insect resistant comprising the step of pressure treating said wood products with an aqueous solution including 18 to 60% by weight sodium silicate, 0.01 to 2% by weight wetting agent and 0.01 to 2% by weight rheology modifier and water.

2. The method for rendering wood products fire, rot and insect resistant as claimed in claim 1, wherein said pressure treating step includes the steps of:
   a. placing said wood products in a pressure vessel;
   b. contacting said wood products with said aqueous solution;
   c. increasing said pressure in said pressure vessel;
   d. draining said aqueous solution from said pressure vessel;
   e. reducing said pressure in said pressure vessel; and
   f. drying said wood products.

3. The method for rendering wood products fire, rot and insect resistant as claimed in claim 1, wherein the wood product is green lumber.

4. The method for rendering wood products fire, rot and insect resistant as claimed in claim 2, further including a step of applying a vacuum to the wood products immediately prior to the contacting step.

5. The method for rendering wood products fire, rot and insect resistant as claimed in claim 2, wherein in the step of increasing the pressure, the pressure is increased to 40–160 pounds per square inch for 20–90 minutes.

6. The method for rendering wood products fire, rot and insect resistant as claimed in claim 4, wherein the wood products are one of particle board, medium-density fiberboard and oriented strand board and the pressure is increased to about 40 pounds per square inch.

7. The method for rendering wood products fire, rot and insect resistant as claimed in claim 4, wherein the wood products are one of a natural wood product and green lumber and the pressure is increased to about 140 pounds per square inch.

8. The method for rendering wood products fire, rot and insect resistant as claimed in claim 1, wherein the pH of the solution is about 11.2–11.4.

9. The method for rendering wood products fire, rot and insect resistant as claimed in claim 1, wherein the aqueous solution consists essentially of about 38% sodium silicate, about 0.1% wetting agent and about 0.1% rheology modifier, the solution having about 21% solids.

10. The method for rendering wood products fire, rot and insect resistant as claimed in claim 9, wherein the solution consists of an aqueous solution of 38% sodium silicate, 0.1% wetting agent and 0.1% rheology modifier, the solution having 21% solids.

11. A method for rendering wood products fire, rot and insect resistant comprising the step of pressure treating said wood products with an aqueous solution including 18 to 60% by weight sodium silicate, 0.01 to 2% by weight wetting agent, 0.01 to 2% by weight rheology modifier, 0.1–1.0% by weight an environmentally safe bacteriocide or fungicide and water.

12. A method for rendering wood products fire, rot and insect resistant comprising the step of pressure treating said wood products with an aqueous solution including 18 to 60% by weight sodium silicate, 0.01 to 2% by weight wetting agent and 0.01 to 2% by weight rheology modifier, a suitable dye and water.

13. A method for rendering wood products fire, rot and insect resistant comprising the step of pressure treating said wood products with an aqueous solution including 18 to 60% by weight sodium silicate, 0.01 to 2% by weight wetting agent, 0.01 to 2% by weight rheology modifier, 1–10% by weight borax and water.

* * * * *